US012716361B2

(12) United States Patent
Ucin Jarne et al.

(10) Patent No.: US 12,716,361 B2
(45) Date of Patent: Aug. 25, 2026

(54) SEALING RING

(71) Applicant: INDUSTRIA DE TURBO PROPULSORES, S.A.U., Zamudio (ES)

(72) Inventors: Ignacio Javier Ucin Jarne, Zamudio (ES); Fernando Domínguez Barbero, Alcobendas (ES); Raúl Chinchilla Adell, Zamudio (ES)

(73) Assignee: INDUSTRIA DE TURBO PROPULSORES, S.A.U., Zamudio (ES)

( * ) Notice: Subject to any disclaimer, the term of this patent is extended or adjusted under 35 U.S.C. 154(b) by 0 days.

(21) Appl. No.: 18/961,524

(22) Filed: Nov. 27, 2024

(65) Prior Publication Data

US 2025/0179926 A1 Jun. 5, 2025

(30) Foreign Application Priority Data

Nov. 30, 2023 (EP) .................................... 23383239

(51) Int. Cl.
*F01D 11/00* (2006.01)

(52) U.S. Cl.
CPC ...... *F01D 11/003* (2013.01); *F05D 2230/313* (2013.01); *F05D 2230/90* (2013.01); *F05D 2240/55* (2013.01); *F05D 2300/175* (2013.01); *F05D 2300/226* (2013.01); *F05D 2300/228* (2013.01)

(58) Field of Classification Search
CPC ............... F01D 11/003; F05D 2230/90; F05D 2230/175; F05D 2230/226; F05D 2230/228; F05D 2240/55; F16J 15/02; F16J 15/022; F16J 15/06; F16J 15/0806
See application file for complete search history.

(56) References Cited

U.S. PATENT DOCUMENTS

| | | | | |
|---|---|---|---|---|
| 2006/0111243 | A1* | 5/2006 | Gan | H10D 30/0321 257/E21.414 |
| 2008/0145649 | A1 | 6/2008 | Mannem et al. | |
| 2018/0291815 | A1 | 10/2018 | Munson et al. | |
| 2019/0234240 | A1 | 8/2019 | Smith | |
| 2020/0006183 | A1* | 1/2020 | Huang | H01L 24/08 |
| 2020/0318737 | A1 | 10/2020 | Stoyanov et al. | |
| 2022/0003125 | A1 | 1/2022 | Stoyanov et al. | |
| 2024/0397828 | A1* | 11/2024 | Lin | H10N 30/063 |

FOREIGN PATENT DOCUMENTS

| | | | |
|---|---|---|---|
| CN | 102691530 | B | 3/2015 |
| GB | 2453231 | A | 4/2009 |

* cited by examiner

*Primary Examiner* — Gilbert Y Lee
(74) *Attorney, Agent, or Firm* — S. J. Intellectual Property Limited

(57) ABSTRACT

The present invention belongs to the technical field of sealing means used in combustion engines. In particular, the invention relates to sealing rings and, more in particular, to sealing rings used in aircraft turbomachinery.

12 Claims, 3 Drawing Sheets

SEALING RING

TECHNICAL FIELD OF THE INVENTION

The present invention belongs to the technical field of sealing means used in combustion engines. In particular, the invention relates to sealing rings and, more in particular, to sealing rings used in gas turbine engines.

BACKGROUND OF THE INVENTION

In the industry of turbomachinery used for example in aero engines, it is common to find annular gaps or passages disposed between stator and rotor stages of the compressor or the turbine, or between co-axial stator members. Said gaps require developing sealing solutions in order to prevent leakage of high pressure gases therethrough.

In gas turbine engines it is common to arrange sealing rings (also known as "piston type sealing rings" or "O-rings") in circumferential grooves provided in several locations such as in the surface of the inner shaft member or in interstage static elements arranged between components having relative movement, in order to prevent such leakages. Therefore, a sealing ring is one of the key components of gas turbine engines.

The components used in the turbomachinery of gas turbine engines are designed to contribute to producing the highest power output with the lowest fuel consumption and the lowest pollutant emissions. In this sense, the maintenance of integrity of sealing rings during operation has a significant impact in the overall performance of gas turbine engines.

In particular, during the engine running, the sealing rings of the gas turbine engine are subjected to not only the impact of thermal fatigue and thermal stress, but also the impact of wear and adhesion arising from the force produced by the delta of air pressure between adjacent cavities.

In recent years, advanced surface treatment technology has been promoted in the field of sealing rings used in the aircraft industry with the objective of preserving the integrity of the sealing ring as well as increasing its service life.

However, current designs of sealing rings used as part of the turbomachinery used in gas turbine engines allow metal to metal contact between the different surfaces of the sealing ring and the corresponding mating surfaces of the groove provided in the part or element of the aero engine through which it is desired to prevent the passage or leakage of gases.

This metal to metal contact promotes different levels of adhesion, and hence degradation of the surfaces, depending on the chemical material compatibility between the mating parts of the sealing ring and the aero engine element.

SUMMARY OF THE INVENTION

The present invention provides a sealing ring and a gas turbine engine. Advantageous embodiments are defined in the dependent claims.

In a first inventive aspect, the invention provides a sealing ring for a gas turbine engine, the sealing ring having a substantially annular shape, and comprising:

- two radial surfaces, namely an inner radial surface and an outer radial surface; and
- two side surfaces extending between the inner radial surface and the outer radial surface;

wherein one of the radial surfaces is configured for abutting against a corresponding first groove surface or second groove surface of a circumferential groove arranged in the gas turbine engine;

wherein one of the side surfaces is configured for abutting against a corresponding third groove surface of the circumferential groove arranged in the gas turbine engine;

wherein:

- at least a portion of each radial surface configured for abutting against the corresponding first or second groove surface, and
- at least a portion of each side surface configured for abutting against the corresponding third groove surface, are coated with a physical vapour deposited (PVD) coating; wherein the PVD coating comprises a passivation layer, and wherein the passivation layer comprises at least one component configured for passivating the corresponding surface of the sealing ring.

A sealing ring is regarded as an element provided to perform a sealing function in order to protect any kind of machinery or equipment operating with a working fluid and where two pieces are in contact so that, during operation, fluid leakage through the corresponding joint is prevented.

The sealing ring of the invention is provided for implementation as part of a gas turbine engine, said sealing ring comprising a substantially annular shape suitable for coupling or insertion into grooves provided on parts of the gas turbine engine, for the purpose of sealing joints or passages that may exist between the gas turbine engine components.

Examples of gas turbine engines which may comprise such joints and are provided with grooves for accommodating sealing rings according to the first inventive aspect are, mainly, turbojets, turbofans, or turboprops.

Among gas turbine engines, examples of parts where there are potential gas leaks and which may comprise a circumferential groove where the sealing ring can be located comprise, among others, static elements belonging to a compressor stage, or static elements belonging to a turbine stage. The term "static" referring to said static elements of the gas turbine engine shall be understood for the present invention as elements that do not rotate but that are movable one with respect to another.

According to the invention, in order to perform the sealing function by engaging a sealing ring in a circumferential groove provided in a gas turbine engine, the sealing ring comprises an inner radial surface, an outer radial surface which has a greater radius than the inner radial surface, and two side surfaces extending between the inner radial surface and the outer radial surface.

Given the substantially annular geometry of the sealing ring, the term radial shall be understood to refer to the geometric centre of the sealing ring. In this sense, it will be understood that the inner radial surface corresponds to the surface of smaller radius, and the outer radial surface corresponds to the surface of greater radius.

In relation to the circumferential groove and the sealing function of the sealing ring, the shape of at least one of the two radial surfaces of the sealing ring matches the geometry of the corresponding groove surface with which it is intended to contact. Additionally, the shape of at least one of the two side surfaces of the sealing ring matches the geometry of an additional surface of the groove with which is intended to contact.

In this regard, at least one radial surface is configured for abutting against the corresponding first groove surface or second groove surface of the circumferential groove arranged in the gas turbine engine and at least one side surface is configured for abutting against a corresponding third groove surface of the circumferential groove arranged in the gas turbine engine.

In an embodiment, the inner radial surface is configured for abutting against the first groove surface of the circumferential groove arranged in the gas turbine engine. In an embodiment, the outer radial surface is configured for abutting against the second groove surface of the circumferential groove arranged in the gas turbine engine.

As for the cross-sectional shape of the sealing ring, i.e. the shape of a cross-section of the sealing ring cut by a plane passing through the geometric centre of the sealing ring and perpendicular to the plane comprising the radii of the sealing ring, in an embodiment said cross-sectional shape is configured to fit the geometry of the circumferential groove provided in the corresponding part of the gas turbine engine, and thus improve the sealing function.

Examples of embodiments of cross-sectional shapes of the sealing ring comprise, among others:

- A rectangular geometry, wherein the inner radial surface and the outer radial surface have the same width (i.e., the dimension of the surface along a direction substantially perpendicular to the plane comprising the radii of the sealing ring), and wherein the side surfaces are substantially flat and parallel to each other.
- A trapezoidal geometry wherein the inner radial surface has a greater width than the outer radial surface.
- A trapezoidal geometry wherein the outer radial surface has a greater width than the inner radial surface.

As aforementioned, during the gas turbine engine operation, the sealing rings are subjected to wear and adhesion. In particular, current designs of sealing rings used as part of the turbomachinery used in gas turbine engines allow metal to metal contact between the different surfaces of the sealing ring and the corresponding surfaces of the groove they are implemented in. This metal to metal contact promotes different levels of adhesion, and hence degradation of the surfaces. Adhesive type wear produces a non-uniform surface condition, which has a significant impact on sealing function.

In this regard, in the present invention at least a portion of each radial surface configured for abutting against the corresponding first or second groove surface and at least a portion of each side surface configured for abutting against the corresponding third groove surface are coated with a physical vapour deposited (PVD) coating.

Said PVD coating comprises a passivation layer. Said passivation layer comprises at least one component configured for passivating the corresponding surface of the sealing ring.

Regarding the passivation provided by the passivation layer of the PVD coating coated over each corresponding surface of the sealing ring, it shall be understood as the technical effect that that makes the surface of the sealing ring less prone to react chemically with the surface of the groove with which it is in contact, avoiding or mitigating phenomena related to corrosion and, especially, to adhesion between the two surfaces.

Advantageously, the PVD coating works as a chemical barrier between mating parts (i.e., one surface of the sealing ring and the corresponding surface of a groove provided in a gas turbine engine) that prevents adhesions and subsequent material degradation leading to a reduction of the sealing function.

In relation to the term physical vapour deposition (PVD), it should be interpreted as any technique or method employed in industry capable of depositing thin coatings or films (with thickness values on the order of nanometers or micrometers).

PVD methods typically comprise depositing the condensed phase of a vaporized form of the desired coating material onto the target surface or surfaces. In this sense, PVD methods typically involve high temperature vacuum evaporation with subsequent condensation, or plasma sputter bombardment.

Known examples of PVD techniques are:

Cathodic Arc Deposition.

Electron beam physical vapour deposition.

Evaporative deposition.

Pulsed laser deposition.

Sputter deposition.

Advantageously, the PVD process allows the application of a uniform, thin, and adherent coating to multiple surfaces of the sealing ring at the same time.

In an embodiment, the PVD coating comprises a base layer, wherein the base layer is arranged over the corresponding surface of the sealing ring and the passivation layer is arranged over the base layer.

In an embodiment, the component of the passivation layer configured for passivating the corresponding surface of the sealing ring is an oxide, preferably an aluminium oxide, or a ceramic material such a nitride or a carbide. In an embodiment, the oxides, nitrides or carbides suitable for the passivation layer are resistant to high temperatures (above 600° C.) and oxidation at said high temperatures.

In an embodiment, the component of the passivation layer configured for passivating the corresponding surface of the sealing ring is selected from: AlCrN, AlTiN, AlCrTiN, AlCrO, $Al_2O_3$, $ZrO_2$, $SiO_2$, MgO, $(Al_xCr_{1-x})$ N wherein x is equal to 0 or 1 or is comprised between 0 and 1, c-BN, $Si_3N_4$, and carbides such as silicon carbide, zirconium carbide or chromium carbide.

In an embodiment, the component of the passivation layer configured for passivating the corresponding surface of the sealing ring is selected from: AlCrN, AlTiN, AlCrTiN and AlCrO.

Aluminium oxide coatings allow passivation of steel alloys, aluminium, titanium, or nickel superalloys, and improve adhesion of the passivation layer to the base layer, if present. They also provide improved performance against corrosion, abrasion, and prevention of adhesion to the corresponding gas turbine engine groove surface.

In an embodiment, the component of the passivation layer configured for passivating the corresponding surface of the sealing ring is an alloyed aluminium oxide Al(M)O, wherein (M) is a metal.

In an embodiment, the metal (M) is chromium and thus the component of the passivation layer configured for passivating the corresponding surface of the sealing ring is AlCrO.

In an embodiment, the base layer comprises a nitride or a carbide. In an embodiment the nitride is CrN or TiN.

In an embodiment, the base layer comprises a multilayer. In an embodiment, the multilayer comprises a plurality of alternating layers of M and MX, wherein a first layer is M and a last layer is MX, and wherein M is a metal and X is carbon or nitrogen. In an embodiment, M is Cr or Ti. The first layer is understood as the layer closest to the corresponding surface of the sealing ring and the last layer is understood as the layer closest to the passivation layer.

In an embodiment, the multilayer has a first layer of Cr, a second layer of CrN, a third layer of Cr and a last layer of CrN. In other embodiments, the multilayer has a different number of layers.

The above nitrides and carbides provided as the base layer provide excellent bonding strength with the base material of the corresponding surface of the sealing ring and reduce and control the residual stress of the passivation layer coated over the base layer.

In an embodiment, the passivation layer is made of the component configured for passivating the corresponding surface of the sealing ring.

In an embodiment, the base layer is made of a nitride or a carbide. In an embodiment the nitride is CrN or TiN.

In an embodiment, the base layer is made of a multilayer. In an embodiment, the multilayer comprises a plurality of alternating layers of M and MX, wherein a first layer is M and a last layer is MX, and wherein M is a metal and X is carbon or nitrogen. The first layer is understood as the layer closest to the corresponding surface of the sealing ring and the last layer is understood as the layer closest to the passivation layer.

In an embodiment, the multilayer has a first layer of Cr, a second layer of CrN, a third layer of Cr and a last layer of CrN.

In an embodiment, at least a portion of each of the two radial surfaces is coated with a physical vapour deposited (PVD) coating.

In an embodiment, at least a portion of each of the two side surfaces is coated with a physical vapour deposited (PVD) coating.

In an embodiment, the entire inner and/or outer radial surface of the sealing ring is coated with the physical vapour deposited (PVD) coating.

In an embodiment, the entire extension of one side surface is coated with the physical vapour deposited (PVD) coating.

In an embodiment, the entire extension of both side surfaces is coated with the physical vapour deposited (PVD) coating.

In an embodiment, the PVD coating is coated over the whole surface of the sealing ring.

In an embodiment, the PVD coating has a thickness of 2 μm-30 μm.

In an embodiment, the base layer has a thickness of 0.5 μm-5 μm.

Advantageously, the thicknesses of the base layer according to this embodiment, provided thanks to the PVD technique by which the PVD coating (and, therefore, the base layer) is provided, mitigate the risk of coating flaking during operation.

In an embodiment, the passivation layer has a thickness of 2 μm-30 μm.

Advantageously, the thicknesses of the passivation layer according to this embodiment, provided thanks to the PVD technique by which the PVD coating (and, therefore, the passivation layer) is provided, mitigate the risk of coating flaking during operation.

In an embodiment, the sealing ring is made of a nickel-based superalloy.

Nickel-based superalloys are the most used material in turbine engines because of their strength and fatigue life combined with their resistance to oxidation and corrosion at high temperature (components that are required to operate above 800° C.). They usually contain significant amounts of alloying elements including light elements like boron or carbon and heavy refractory elements like tantalum, tungsten, or rhenium.

Examples of nickel-based superalloys usable as materials for the sealing ring are IN792, M247LC, WASPALOY® and C263.

In a second inventive aspect, the invention provides a gas turbine engine comprising a circumferential groove having an annular shape and a sealing ring according to the first inventive aspect, the circumferential groove comprising:

- a first groove surface having a substantially circumferential shape;
- a second groove surface having a substantially circumferential shape with a greater radius than the first groove surface; and
- at least a third groove surface extending between the first groove surface and the second groove surface;

wherein the sealing ring is arranged within the groove, such that one of the radial surfaces of the sealing ring abuts against the corresponding first or second groove surface, and one of the side surfaces of the sealing ring abuts against a corresponding third groove surface.

In an embodiment, the circumferential groove is defined between two static elements of a compressor stage, and the sealing ring is arranged sealing a joint between said static elements.

In an embodiment, the circumferential groove is defined between two static elements of a turbine stage, and the sealing ring is arranged sealing a joint between said static elements.

In an embodiment, at least one of the static elements between which the groove is defined is made of a nickel-based superalloy. In an embodiment, both static elements are made of a nickel-based superalloy.

Examples of nickel-based superalloys usable as materials for the static elements are IN792, M247LC, WASPALOY® and C263.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

Once the object of the invention has been outlined, specific non-limitative embodiments are described hereinafter.

FIGS. 1A-2B show schematic cross-sectional views of a circumferential groove (21) and a sealing ring (10) implemented as part of a gas turbine engine (20) according to different embodiments of the invention.

Figure 1A:
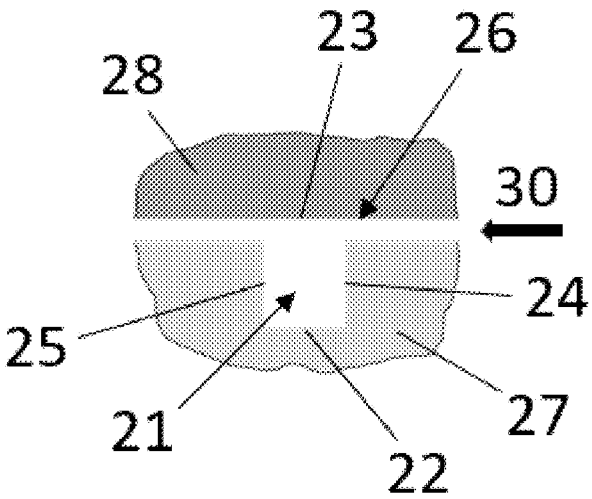
FIGS. 1A-1B These figures show schematic cross-sectional views of the implementation of a sealing ring as part of a gas turbine engine according to an embodiment of the invention.
Figure 1B:
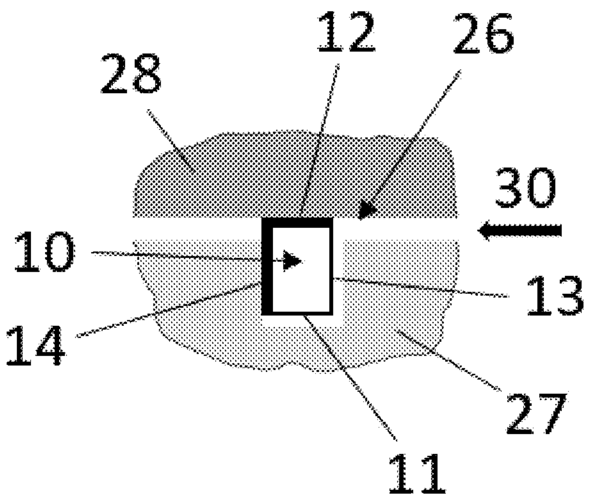

Specifically, FIGS. 1A-1B show a portion of an embodiment of a gas turbine engine (20) where it can be observed a schematic representation of the elements of said engine (20) provided to cooperate with a sealing ring (10) in order to prevent gas leakage (30) through a passage or joint (26) arranged in the gas turbine engine (20) between two static elements (27, 28), namely a first static element (27) and a second static element (28). These static elements (27, 28) shall be understood as static in that they do not rotate but allow relative displacement between them.

More specifically, in the embodiment shown in FIGS. 1A-1B a circumferential groove (21) can be observed arranged in a static element (27).

According to some embodiments of the invention, said static element (27) is part of a compressor stage or a turbine stage.

Although FIG. 1A schematically shows a portion of a cross section of the gas turbine engine (20) cut by a plane parallel to the longitudinal axis of the gas turbine engine (20), and perpendicular to the rotor blade discs as well as the guide vanes, it is understood that said circumferential groove (21) has an annular shape.

As it can be seen in the embodiment shown in FIG. 1A, for the coupling of the sealing ring (10) in the circumferential groove (21) and the provision of the sealing function, the circumferential groove (21) comprises a first groove surface (22) having a substantially circumferential shape, a second groove surface (23) having a substantially circumferential shape with a greater radius than the first groove surface (22), and two parallel third groove surfaces (24, 25) extending between the first groove surface (22) and the second groove surface (23). In the embodiment of FIG. 1A, the first groove surface (22) and the third groove surfaces (24, 25) are part of the first element (27), whereas the second groove surface (23) is part of the second element (28). Both elements (27, 28) define the circumferential groove (21).

As can be seen, all the first (22), second (23) and two third (24, 25) groove surfaces define a substantially rectangular cross sectional shape of the circumferential groove (21).

While FIG. 1A shows only the elements of the aero engine (20) provided to cooperate with a sealing ring (10), but not including said sealing ring (10), FIG. 1B shows a sealing ring (10) implemented in the circumferential groove (21) shown in FIG. 1A. Regarding the shape of the sealing ring (10), in the same manner as the circumferential groove (21), although FIG. 1B schematically shows a portion of a cross section of the gas turbine engine (20) cut by a plane parallel to the longitudinal axis of the gas turbine engine (20), and perpendicular to the rotor blade discs as well as the guide vanes, it is understood that said sealing ring (10) has a substantially annular shape.

As it can be seen in the rectangular cross-sectional view of the sealing ring (10) shown in FIG. 1B, the sealing ring (10) comprises an inner radial surface (11), an outer radial surface (12) which has a greater radius than the inner radial surface (11), and two parallel side surfaces (13, 14) extending between the inner radial surface (11) and the outer radial surface (12).

Regarding the coupling of the sealing ring (10) in the circumferential groove (21), as it can be seen, in the embodiment of FIG. 1B the outer radial surface (12) of the sealing ring (10) is shown abutting against the second groove surface (23) of the circumferential groove (21) and one of the two side surfaces (14) of the sealing ring (10) is shown abutting a corresponding third groove surface (25) of the circumferential groove (21).

As regards the materials of which both the sealing ring (10) and the static elements (27, 28) of the gas turbine engine (20) in which the circumferential groove (21) is provided, in the particular embodiment shown in FIG. 1B, both the sealing ring (10) and the static elements (27, 28) are made of a nickel-based superalloy.

According to the invention, in order to prevent adhesion between the sealing ring (10) and the part of the gas turbine engine (20) comprising the circumferential groove (21) in which the sealing ring (10) is implemented during operation, which would cause adhesive type wear and degradation of the surfaces, at least a portion of the surfaces (11, 12, 13, 14) of the sealing ring (10) abutting a corresponding groove surface of the circumferential groove (21) provided in the gas turbine engine (20) are coated with a physical vapour deposited (PVD) coating.

Said PVD coating works as a barrier that avoids the direct contact between the materials of the sealing ring (10) and the part of the gas turbine engine (20) comprising the circumferential groove (21) in which the sealing ring (10) is implemented, and therefore prevents adhesions and subsequent material degradation leading to a reduction of sealing function.

In this regard, in the embodiment shown in FIG. 1B, at least a portion of the outer radial surface (12) and at least a portion of the side surface (14) that abuts against a third groove surface (25) of the circumferential groove (21) are coated with a physical vapour deposited (PVD) coating. In an embodiment, the outer radial surface (12) and the side surface (14) are entirely coated with the PVD coating.

Figure 2A:
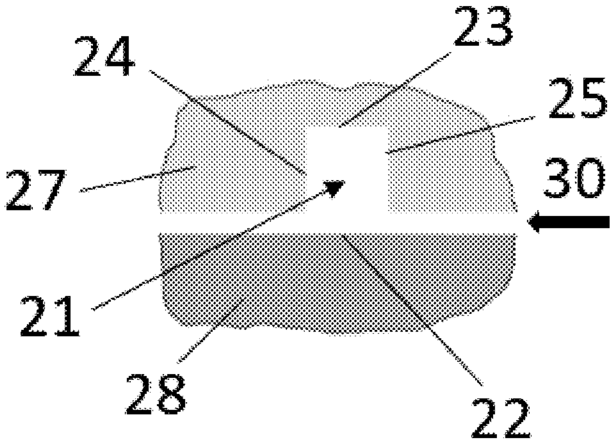
FIGS. 2A-2B These figures show schematic cross-sectional views of the implementation of a sealing ring as part of a gas turbine engine according to another embodiment of the invention.
Figure 2B:
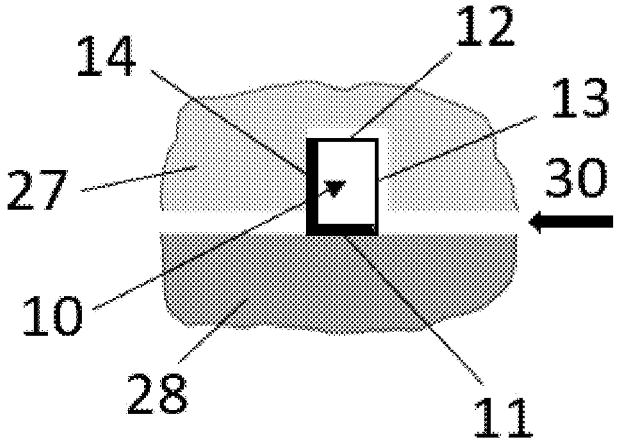

FIGS. 2A-2B show a schematic cross-sectional view of a circumferential groove (21) and a sealing ring (10) implemented as part of a gas turbine engine (20) according to another embodiment of the invention. As described in connection with FIGS. 1A-1B, FIGS. 2A-2B show a portion of another embodiment of a gas turbine engine (20) where it can be observed a schematic representation of the elements of said engine (20) provided to cooperate with a sealing ring (10) in order to prevent gas leakage (30) through a passage or joint (26) arranged in the gas turbine engine (20) between two static elements (27, 28), namely a first static element (27) and a second static element (28). These static elements (27, 28) do not rotate but one is movable with respect to the other.

In the embodiment of FIG. 1A, the first groove surface (22) and the third groove surfaces (24, 25) are part of the first element (27), whereas the second groove surface (23) is part of the second element (28). By contrast, in the embodiment of FIG. 2A, the second groove surface (23) and the third groove surfaces (24, 25) are part of the first element (27), whereas the first groove surface (22) is part of the second element (28). The first groove surface (22) has a substantially circumferential shape, the second groove surface (23) has a substantially circumferential shape with a greater radius than the first groove surface (22), and the two parallel third groove surfaces (24, 25) extend between the first groove surface (22) and the second groove surface (23).

While FIG. 2A shows only the elements of the gas turbine engine (20) provided to cooperate with a sealing ring (10), but not including said sealing ring (10), FIG. 2B shows a sealing ring (10) implemented in the circumferential groove (21) shown in FIG. 2A. As in the embodiment of FIG. 1B, for the embodiment of FIG. 2B the sealing ring (10) has a substantially annular shape. Moreover, the configuration of the sealing ring (10) according to a rectangular cross-sectional view as shown in FIG. 2B is the same as in the embodiment of FIG. 1B. That is, the sealing ring (10) of this FIG. 2B comprises an inner radial surface (11), an outer radial surface (12) which has a greater radius than the inner radial surface (11), and two parallel side surfaces (13, 14) extending between the inner radial surface (11) and the outer radial surface (12).

In the embodiment of FIG. 2B, the inner radial surface (11) of the sealing ring (10) is shown abutting against the first groove surface (22) of the circumferential groove (21) and one of the two side surfaces (14) of the sealing ring (10) is shown abutting a corresponding third groove surface (24) of the circumferential groove (21). In the embodiment shown in FIG. 2B, at least a portion of the inner radial surface (11) and at least a portion of the side surface (14) that abuts against a third groove surface (27) of the circumferential groove (21) are coated with a physical vapour deposited (PVD) coating. In an embodiment, the inner radial surface (11) and the side surface (14) are entirely coated with the PVD coating.

In FIGS. 1B and 2B the PVD coating is schematically depicted with thick black line.

As to the features of said PVD coating coated over the surfaces (12, 14) of the sealing ring (10) shown in FIG. 1B, these are described in detail with reference to FIG. 3.

Figure 3:
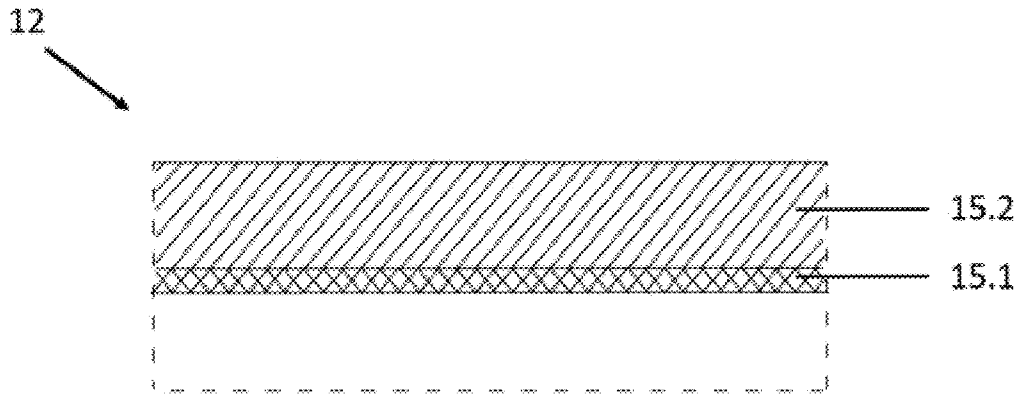
FIG. 3 This figure shows a schematic cross-sectional view of a portion of a surface of a sealing ring provided with a PVD coating according to an embodiment of the invention.

In particular, FIG. 3 shows a schematic cross-sectional view of a portion of the outer radial surface (12) of the sealing ring (10) shown in FIG. 1B cut by a plane perpendicular to said outer radial surface (12).

Although reference is made to the outer radial surface (12), the following description of the features of the PVD coating on said surface (12) applies to the PVD coating coated over any other surface (11, 12, 13, 14) of the sealing ring (10) according to any of the embodiments of FIGS. 1B-2B.

In particular, the PVD coating shown in FIG. 3 comprises a base layer (15.1) coated over the outer radial surface (12) of the sealing ring (10), said base layer (15.1) comprising CrN, and having a thickness of 0.5 μm-5 μm. As can be seen, the base layer (15.1) is depicted with a pattern of consecutive crosses.

Additionally, as can be seen, a passivation layer (15.2) is provided over the base layer (15.1), the passivation layer (15.2) comprising at least one component configured for passivating the corresponding surface, this is, the outer radial surface (12) of the sealing ring (10). In particular, in the embodiment of the PVD coating shown in FIG. 3, the component of the passivation layer (15.2) configured for passivating the outer radial surface (12) of the sealing ring (10) is an alloyed aluminium oxide Al(M)O, wherein, in the particular embodiment shown, (M) is chromium. Preferably, the passivation layer (15.2) has a thickness of 2 μm-30 μm.

The passivation layer (15.2) is depicted with a pattern of parallel oblique stripes.

Figure 4:
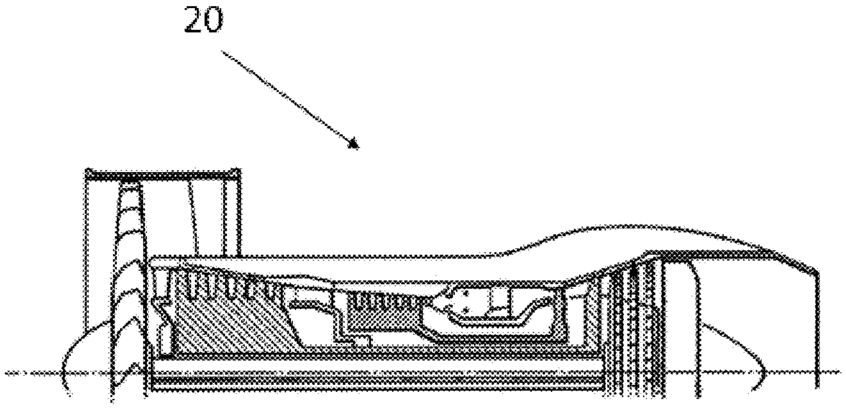
FIG. 4 This figure shows a schematic cross-sectional view of a gas turbine engine according to an embodiment of the invention.

FIG. 4 shows a portion of a gas turbine engine (20) according to an embodiment of the invention.

The invention claimed is:

1. A sealing ring adapted for insertion into a circumferential groove of a gas turbine engine, the circumferential groove being defined between two static elements of a compressor stage or a turbine stage of the gas turbine engine, the sealing ring having a substantially annular shape, and comprising:

two radial surfaces, namely an inner radial surface and an outer radial surface; and two side surfaces extending between the inner radial surface and the outer radial surface;

wherein one of the radial surfaces is configured for abutting against a corresponding first groove surface or second groove surface of the circumferential groove arranged in the gas turbine engine;

wherein one of the side surfaces is configured for abutting against a corresponding third groove surface of the circumferential groove arranged in the gas turbine engine;

wherein:

at least a portion of the radial surface configured for abutting against the corresponding first or second groove surface, and at least a portion of the side surface configured for abutting against the corresponding third groove surface, are coated with a physical vapour deposited (PVD) coating;

wherein the PVD coating comprises a passivation layer, and wherein the passivation layer comprises at least one component configured for passivating the corresponding surface of the sealing ring; and wherein the sealing ring is configured to be arranged into the circumferential groove sealing a joint between the static elements;

wherein the component of the passivation layer configured for passivating the corresponding surface of the sealing ring is an alloyed aluminium oxide Al(M)O, wherein (M) is a metal; and wherein:

i) the first groove surface and the third groove surfaces are part of the first element and the second groove surface is part of the second element; or ii) the second groove surface and the third groove surfaces are part of the first element and the first groove surface is part of the second element.

2. The sealing ring according to claim 1, wherein the metal (M) is chromium.

3. The sealing ring according to claim 1, wherein the PVD coating comprises a base layer, wherein the base layer is arranged over the corresponding surface of the sealing ring and the passivation layer is arranged over the base layer.

4. The sealing ring according to claim 3, wherein the base layer comprises a nitride or a carbide.

5. The sealing ring according to claim 3, wherein the base layer comprises a multilayer.

6. The sealing ring according to claim 5, wherein the multilayer comprises a plurality of alternating layers of M and MX, wherein a first layer is M and a last layer is MX, and wherein M is a metal and X is carbon or nitrogen.

7. The sealing ring according to claim 3, wherein the base layer has a thickness of 0.5 μm-5 μm.

8. The sealing ring according to claim 1, wherein the PVD coating has a thickness of 2 μm-30 μm.

9. The sealing ring according to claim 1, wherein the passivation layer has a thickness of 2 μm-30 μm.

10. The sealing ring according to claim 1, wherein the sealing ring is made of a nickel-based superalloy.

11. A gas turbine engine comprising a circumferential groove having an annular shape and a sealing ring according to any of the previous claims, the circumferential groove comprising:

a first groove surface having a substantially circumferential shape;

a second groove surface having a substantially circumferential shape with a greater radius than the first groove surface; and at least a third groove surface extending between the first groove surface and the second groove surface;

wherein the sealing ring is arranged within the groove, such that:

one of the radial surfaces of the sealing ring abuts against the corresponding first groove surface or second groove surface, and one of the side surfaces of the sealing ring abuts against a corresponding third groove surface;

wherein the circumferential groove is defined between two static elements of a compressor stage or a turbine stage of the gas turbine engine, and wherein the sealing ring is arranged sealing a joint between said static elements.

12. The gas turbine engine according to claim 11, wherein at least one of the static elements is made of a nickel-based superalloy.

* * * * *